Patented Aug. 26, 1952

2,608,561

UNITED STATES PATENT OFFICE 2,608,561

METHOD OF MAKING DUROQUINONE

Bror Ragnar Mathias Monnberg and Alpo Johannas Ora, Rauma, Finland, assignors of one-half to Rauma-Raahe Oy, a company of Finland No Drawing. Application May 24, 1950, Serial No. 164,032. In Finland January 9, 1950

4 Claims. (Cl. 260—396)

This invention relates to a new method for the production of duroquinone.

The object of the invention is to produce duroquinone at a considerably lower cost than has heretofore been possible using known methods.

This saving in cost is effected by the use of pentamethylphenol as starting material. The pentamethylphenol may be chemically pure or may contain impurities. In the latter case it is necessary to refine the duroquinone obtained therefrom. This can be done by known methods.

The production of duroquinone in accordance with the present invention comprises the simple oxidation of pentamethylphenol. Many known methods of oxidation may be employed. An example of one such method is illustrated in the following example wherein the parts are given by weight.

Example 1 part pentamethylphenol was treated with 2 parts of potassium dichromate, 11 parts of water and 1 part of concentrated sulphuric acid and allowed to stand at room temperature for about one hour. Duroquinone was then separated by extraction with ether. A yield of 0.95 part of duroquinone was obtained.

In place of potassium dichromate sodium dichromate may be used, depending upon economic considerations. It has been found that the best results are obtained by conducting the reaction at room temperature but if desired the mixture may be heated slightly to speed the reaction.

While in the above example the duroquinone was separated by extraction with ether, some other known method of separation may be used, and other organic solvents such as benzene may also be employed.

As the molecular weights of pentamethylphenol and duroquinone are practically the same, yields up to 100% may be obtained, expressed either as theoretical absolute or technically. In actual experiments, however, the yield has varied between 61% and 96%, being generally above 90%.

The reaction proceeds according to the formula:

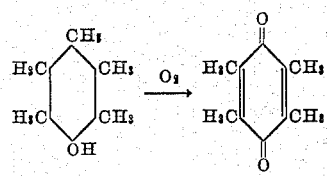

In addition to duroquinone one equivalent of monobasic acid is formed. This acid has not been definitely identified but it is believed to be formic acid, in which case the reaction would be:

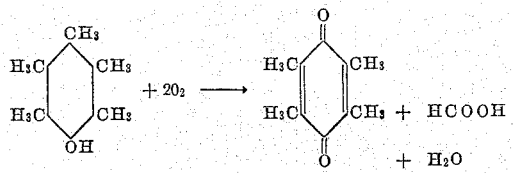

As stated, there are many known means and ways of oxidation which might be employed. It has been found that the most economical form of oxidation is that carried out in the gaseous phase, as ordinary air is the cheapest oxidizing agent. Pentamethylphenol is a readily volatile substance and, therefore, can be passed as a gas over a suitable known catalyst and oxidized to duroquinone by controlling the amount of air supplied.

Certain of the well known oxidizing agents may also be used in solution. However, chromic acid, obtained by the reaction of sulphuric acid with potassium or sodium dichromate has been found to be the best oxidizing agent for the purpose.

We claim:

1. A method of producing duroquinone in which pentamethylphenol is oxidized with sulphuric acid and a compound selected from the group consisting of sodium dichromate and potassium dichromate.

2. A method of producing duroquinone which comprises treating pentamethylphenol with a mixture consisting of water, sulphuric acid and an alkali dichromate at room temperature and recovering duroquinone.

3. A method according to claim 2, in which duroquinone is separated by extraction with ether.

4. A method of producing duroquinone which comprises forming a mixture of about 2 parts by weight of alkali dichromate, about 11 parts by weight of water and about 1 part by weight of sulphuric acid, adding to said mixture about one part by weight of pentamethylphenol, allowing said mixture to react about one hour and recovering duroquinone.

BROR RAGNAR MATHIAS MONNBERG.
ALPO JOHANNAS ORA.

REFERENCES CITED

The following references are of record in the file of this patent:

Smith: Jour. Org. Chem. 4, 318–322 (1939).